United States Patent
Fuchs (10) Patent No.: US 9,626,164 B1
(45) Date of Patent: Apr. 18, 2017

(54) TEST-DRIVEN DEVELOPMENT MODULE FOR REPOSITORY-BASED DEVELOPMENT

(71) Applicant: SAP SE, Walldorf (DE)

(72) Inventor: Matthias Fuchs, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/974,638

(22) Filed: Dec. 18, 2015

(51) Int. Cl.
*G06F 9/44* (2006.01)

(52) U.S. Cl.
CPC ................................ *G06F 8/36* (2013.01)

(58) Field of Classification Search
CPC ............................................. G06F 8/36
See application file for complete search history.

(56) References Cited

U.S. PATENT DOCUMENTS

| | | | | |
|---|---|---|---|---|
| 2003/0225840 A1* | 12/2003 | Glassco | ................. | G06Q 10/10 709/206 |
| 2010/0106705 A1* | 4/2010 | Rush | ........................ | G06F 8/36 707/709 |
| 2013/0218867 A1* | 8/2013 | DeLuca | ................. | G06Q 50/01 707/722 |
| 2015/0046492 A1* | 2/2015 | Balachandran | ........... | G06F 8/36 707/772 |
| 2015/0161266 A1* | 6/2015 | Conradt | ............ | G06F 17/30867 707/706 |
| 2015/0169821 A1* | 6/2015 | Peters | ................. | G06Q 10/101 703/1 |

OTHER PUBLICATIONS

"Test-driven development", Wikipedia, [Online]. Retrieved from the Internet: <URL: https://en.wikipedia.org/wiki/Test-driven_development>, (Accessed Dec. 8, 2015), 14 pgs.

* cited by examiner

*Primary Examiner* — Philip Wang
(74) *Attorney, Agent, or Firm* — Schwegman Lundberg & Woessner, P.A.

(57) ABSTRACT

A method of selecting reusable programming implementations from a code repository for inclusion in a programming project is disclosed. A test is received at a software development tool installed on a system. The test is communicated to an application executing on an additional system for processing. The processing includes determining a result representing an application of the test by the application to each programming implementation of a first search set of programming implementations of a plurality of programming implementations in a code repository. The result includes a first result set of programming implementations selected from the plurality of programming implementations based on each programming implementation of the first result set satisfying the test. The result is received from the additional system. An option is provided to select a programming implementation from the first result set. The selected programming implementation is automatically included in the programming project.

20 Claims, 6 Drawing Sheets

TEST-DRIVEN DEVELOPMENT MODULE FOR REPOSITORY-BASED DEVELOPMENT

TECHNICAL FIELD

The present disclosure generally relates to automation of software development and, in one specific example, to a module for a software development tool that is designed to facilitate automatic selection of programming implementations from a code repository for inclusion in a software development project.

DETAILED DESCRIPTION

In the following description, for purposes of explanation, numerous specific details are set forth in order to provide an understanding of example embodiments of the present subject matter. It will be evident, however, to those skilled in the art that example embodiments may be practiced without these specific details.

Reusing of code and testing of code are two potentially important aspects of software development. For example, reusing code, whether developed for a current project or another project, can save development time. Additionally, reusing code that has been well tested can save testing time. Furthermore, including well-tested, previously-developed code in a project can help to ensure the stability of the project.

Test-driven development (TDD) is a software development process that includes (1) writing an (initially failing) test case for a programming implementation that defines a desired improvement or new function for the programming implementation and (2) producing a minimum amount of code to modify the programming implementation such that it passes the test case.

In example embodiments, TDD may be used as a model for identifying reusable programming implementations in a code repository (e.g., as candidates for inclusion in a programming project). For example, assume a programming implementation that performs a square root calculation would be useful for inclusion in a programming project. A first test of whether a programming implementation in a code repository provides the desired functionality may be whether the programming implementation returns a value of "1" when given an input of "1." However, although this first test is likely to exclude many programming implementations in the code repository because they do not have the desired functionality, this first test is also likely to include programming implementations that provide functions other than a square root function. For example, this first test would be satisfied by programming implementations for a squaring function as well as a square root function. Thus, a second test may be needed to identify the programming implementation in the code repository that has the desired functionality. For example, a second test may be whether the programming implementation returns a value of "3" when given an input of "9."

In example embodiments, a count of programming implementations in the code repository that satisfy one or more such tests may be below a threshold count from which a desired programming implementation may be readily ascertained for inclusion in the project (e.g., via analysis of metadata items associated with the programming implementations, as explained in more detail below); otherwise, additional test cases may be needed to further narrow down the candidates.

In example embodiments, additional test cases may be written and submitted asynchronously (e.g., while previous test cases are being applied against programming implementations in the code repository), previous test cases may be removed or modified asynchronously, and results may be updated or modified asynchronously (e.g., as the results are being obtained). Furthermore, sets of programming implementations in the code repository may be prioritized for or excluded from testing based on results corresponding to previous test case submissions, as explained in more detail below.

In example embodiments, a user interface (e.g., a graphical or command-line user interface) may be presented to a software developer on a client system from which the software developer may see the results obtained from the code repository, submit test cases, view metadata corresponding to the identified programming implementations, and select one of the identified programming implementations for inclusion in a project.

In example embodiments, metadata items associated with the programming implementations may be included in the test cases or used to filter the results. Such metadata items may include version history information (e.g., the date at which the programming implementation was submitted to the code repository, an identifier of the original author of the programming implementation, a date at which the programming implementation was last revised, or an identifier of the author of the last revision), a measure of the maturity of the programming implementation (e.g., information pertaining to test cases passed by the programming implementation or projects currently using the programming implementation), comments submitted by developers along with submissions or revisions, and so on.

In example embodiments, a method of selecting reusable programming implementations from a code repository for inclusion in a programming project is disclosed. One or more tests are received at a software development tool installed on a system. The one or more tests are communicated to an application executing on an additional system for processing. The processing includes determining a result representing an application of the one or more tests by the application to each programming implementation of a first search set of programming implementations of a plurality of programming implementations in a code repository. The result includes a first result set of programming implementations selected from the first search set. The selection corresponds to programming implementations in the first search set that satisfy the one or more tests. The result is received from the additional system. An option is provided to select a programming implementation from the first result set. Based on an acceptance of the option, the selected programming implementation is automatically included in the programming project.

In example embodiments, the searching (e.g., the testing of programming implementations in the code repository to determine whether they satisfy the one or more tests) may be performed by one or more background processes, with partial results being communicated asynchronously to the foreground during the searching. Thus, the one or more tests may be modified (e.g., added, removed, or changed), before complete results are obtained from a previous search. The searching process may then adapt to the changes to the one or more tests (e.g., by reusing as many of the results of the completed search as possible or adapting prioritization of new searches based on previous results obtained), as explained in more detail below.

In example embodiments, the result of the application of the one or more tests may include one or more programming implementations that only partially satisfy the one or more tests. A result in which no programming implementations fully satisfy the one or more tests may be indicative of a need to develop a new programming implementation instead of reusing a programming implementation in the code repository. In this case, programming implementations that partially satisfy one or more of the tests may be considered as candidates for serving as a starting point for creating the new programming implementation.

Figure 1:
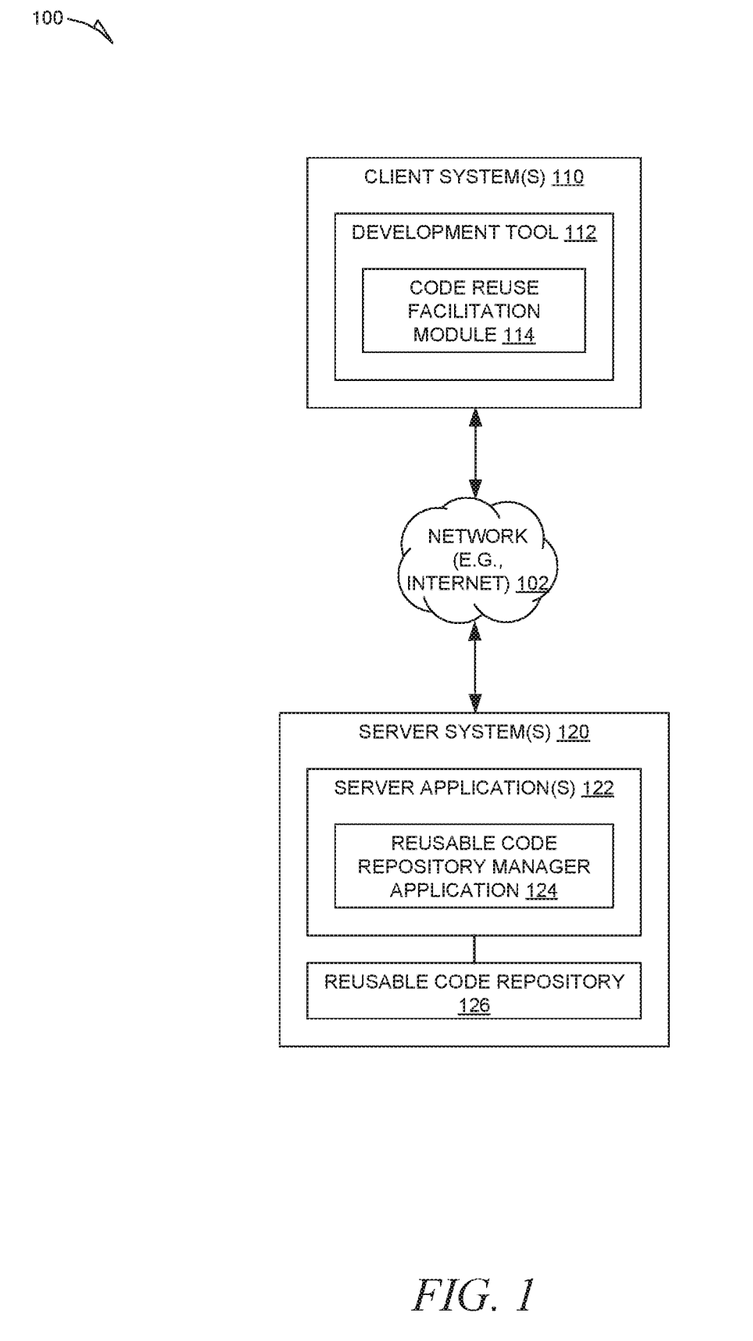
FIG. 1 is a network diagram depicting a system within which various example embodiments may be deployed.

FIG. 1 is a network diagram depicting a system 100, within which various example embodiments may be deployed. The system includes client system(s) 110. Examples of the client system(s) 110 may include personal computers and mobile devices, including wearable computing devices. A mobile device may be any device that is portable or capable of being carried. Examples of mobile devices include a laptop computer, a tablet computer (e.g., an iPad), a mobile or smart phone (e.g., an iPhone), and so on. A wearable computing device may be any computing device that may be worn by a user. Examples of wearable computing devices include a smartwatch (e.g., a Pebble E-Paper Watch), an augmented reality head-mounted display (e.g., Google Glass), and so on. Such devices may use natural language recognition to support hands-free operation by a user.

The client system(s) 110 include a development tool 112. Examples of development tools include Dreamweaver, Eclipse, NetBeans, Microsoft Visual Studio, and so on. The development tool 112 may include a code reuse facilitation plug-in or module 114 that is configured to facilitate reuse of code in a code repository for programming projects being developed in the development tool 112. In example embodiments, the development tool 112 and code reuse facilitation module 114 may each be implemented by one or more processors of the client system(s) 110. In example embodiments, the code reuse facilitation module 114 may receive submissions of test cases, communicate the test cases to a reusable code repository manager application 124, and receive results from the reusable code repository manager application 124. In example embodiments, the code reuse facilitation module 114 may generate one or more user interfaces for collecting submission of test cases, reporting results, and facilitating incorporation of selected programming implementations into a programming project associated with the development tool 112.

In example embodiments, the client system(s) 110 may include one or more client applications in addition to the development tool 112. Such additional client applications may include a web browser (e.g., a browser, such as the Internet Explorer browser developed by Microsoft Corporation of Redmond, Wash.), a native application (e.g., an application supported by an operating system of the device (e.g., one of the client system(s) 110), such as Android, Windows, or iOS), or other applications. Each of the one or more client applications may include a module (e.g., a plug-in, add-in, or macro) that adds a specific service or feature to the client application.

The client system(s) 110 may communicate with server system(s) 120 via a network 102. In example embodiments, the network 102 includes one or more of the Internet, a Wide Area Network (WAN), or a Local Area Network (LAN).

The server system(s) 120 include server application(s) 122 and a reusable code repository 126. The server application(s) 122 may provide server-side functionality (e.g., via the network 102) to the development tool 112 executing on the client system(s) 110. The server application(s) 122 include the reusable code repository manager application 124. The reusable code repository manager application 124 may be configured to receive test cases from the code reuse facilitation module 114, determine whether programming implementations in the reusable code repository 126 satisfy the tests, and send results to the code reuse facilitation module 114. In example embodiments, the reusable code repository manager application 124 may store the programming implementation as source code or executable code (or both). Many languages permit converting between both representations, either with built-in functionality (such as the eval function used in Javascript) or libraries (such as javax.tools.JavaCompiler) or by using third-party tools (such as decompilers). In its simplest form the code repository may include collections of files (containing source or executable code). The code included in those files may be loaded into memory and executed (e.g., using class loaders in the context of Java).

Although they are not shown in FIG. 1, the server systems(s) 120 may include an API server or a web server configured to provide programmatic and web interfaces, respectively, to one or more application servers. The application servers may host the one or more user interfaces and server applications, including the server application(s) 122. Additionally, the application server may, in turn, be coupled to one or more data services or database servers that facilitate access to one or more databases, including NoSQL or non-relational data stores, of which the reusable code repository 126 may be one example.

The server application(s) 122 may provide a number of functions and services to users who access the server system(s) 120. While the server application(s) 122 are shown in FIG. 1 to be included on the server system(s) 120, in alternative embodiments, the server application(s) 122 may form part of a service that is separate and distinct from the server system(s) 120. Similarly, while the code reuse facilitation module 114 is shown to be included in the development tool 112, in alternative embodiments, the code reuse facilitation module 114 may be a stand alone application.

Further, while the system 100 shown in FIG. 1 employs a client-server architecture, example embodiments are, of course, not limited to such an architecture, and could equally well find application in a distributed or peer-to-peer architecture system, for example. The various applications could also be implemented as standalone software programs, which do not necessarily have computer networking capabilities. Additionally, although not shown in FIG. 1, it will be readily apparent to one skilled in the art that the client system(s) 110 and server system(s) 120 may be coupled to multiple additional networked systems.

Figure 2:
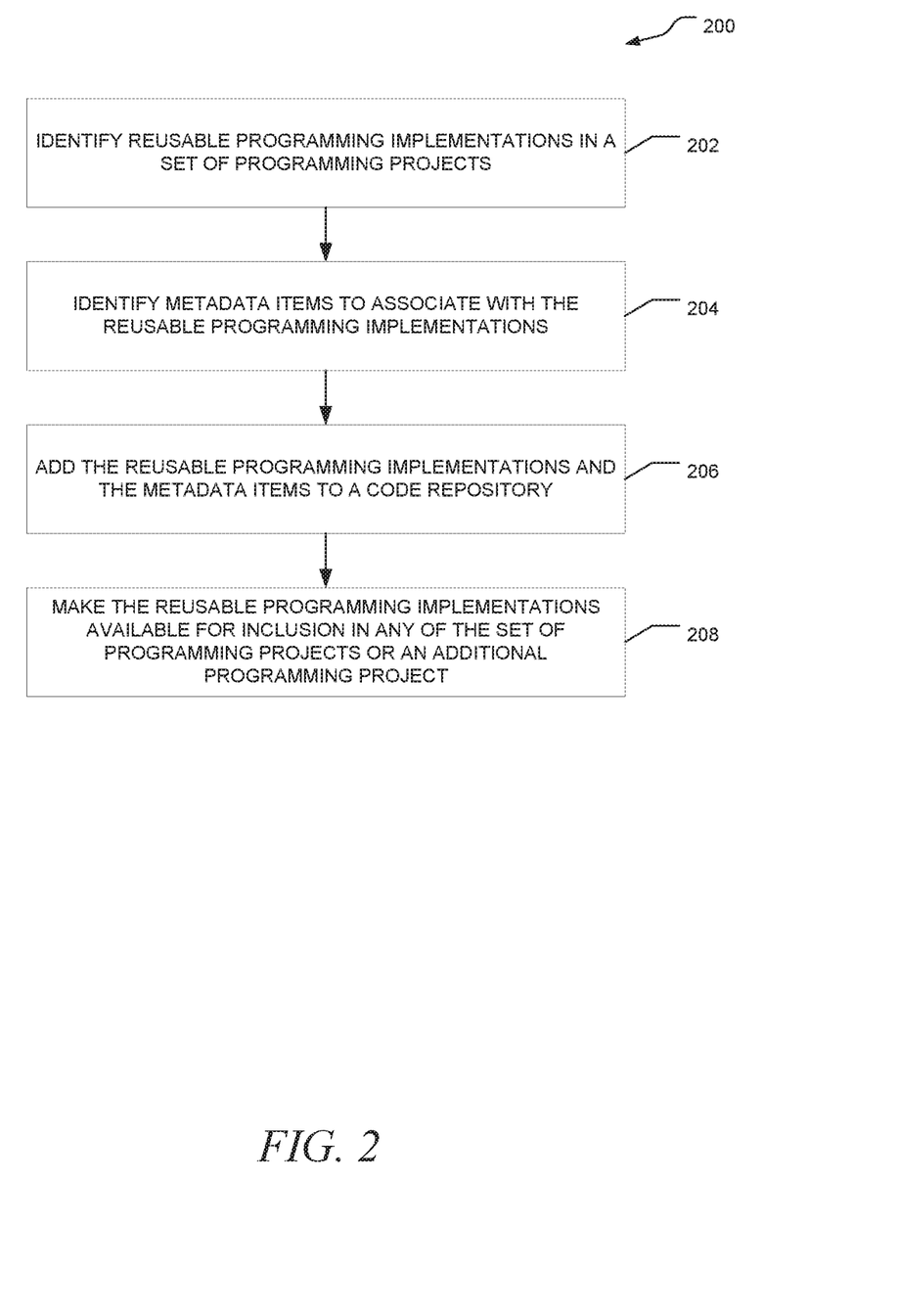
FIG. 2 is a flow chart of an example method, in accordance with an example embodiment, of managing a code repository.

FIG. 2 is a flow chart of an example method 200 of managing a code repository. In example embodiments, this method may be implemented by the code reuse facilitation module 114 in conjunction with the reusable code repository manager application 124.

At operation 202, reusable programming implementations are identified. In example embodiments, the reusable programming implementations are identified automatically from sets of programming implementations associated with sets of programming projects. For example, a reusable programming implementation may be identified from a set of programming implementations associated with a programming project based on metadata items associated with the programming implementation transgressing corresponding metadata item thresholds.

For example, a reusable programming implementation may be identified based on a metadata item associated with the programming implementation indicating that the programming implementation has reached a level of maturity, the level exceeding a maturity level threshold value. In example embodiments, the level of maturity may be based on an analysis of metadata items corresponding to the version history of the programming implementation, the testing history of the programming implementation, a reputation of the author(s) of the programming implementation, and so on.

In example embodiments, the level of maturity may also be based on a metadata item indicating that the reusable programming implementation is included in a number of programming projects, the number exceeding a programming project count threshold value. Thus, for example, a programming implementation may be identified as having a high level of maturity based on a composite maturity score transgressing a maturity score threshold, the maturity score being calculated based on any combination of metadata items. Furthermore, the metadata items used in the calculation may be weighted and configurable (e.g., by an administrator of the system).

In example embodiments, other factors pertaining to reusability of code may be considered. For example, another important criterion for reusability of code may be minimal dependence on other code. For example, code that relies the least on other code (e.g., outside of built-in functionality or standard libraries), may be identified as such through a dependence score.

In addition, a reusable programming implementation may be identified based on one or more characteristics of the programming implementation itself, such as a signature of the programming implementation (e.g., a description of namespaces, modules, types, or members corresponding to the programming implementation), a size of the programming implementation (e.g., in bytes), existence of or extent of developer comments, and so on. In example embodiments, for programming implementations implemented using a typed programming language, such as Java or C, exact signature matches could be used. In example embodiments, a more flexible approach includes permuting parameter positions and using default values for parameters included in a programming implementation that are not included in a test case. These characteristics may be assigned numeric, configurable, weighted values and combined into a composite characteristic score. The composite characteristic score and the composite maturity score (and/or other scores, such as a dependence score) may be combined or used separately to determine a reusability score for the programming implementation. Reusable programming implementations may then be identified based on the reusability score transgressing a configurable reusability threshold value.

In example embodiments, a programming implementation may be identified manually by a software developer or flagged by a software developer for special consideration in an automated process for identifying reusable code implementations in existing programming projects. In example embodiments, programming implementations flagged by a software developer may have their reusability scores boosted (e.g., by a configurable amount).

At operation 204, metadata items may be identified for association with the identified reusable programming implementations. In example embodiments, at least some of the metadata items are collected automatically (e.g., via a version control system associated with the programming implementations or during modification of the reusable code repository). In example embodiments, a user may be prompted via a user interface to provide metadata items pertaining to the identified reusable programming implementations during submission or modification of the reusable programming implementations.

At operation 206, the identified reusable programming implementations and their corresponding metadata items are added to a code repository.

At operation 208, the code repository is made accessible for searching for reusable programming implementations in accordance with a test-driven model, as described in more detail below.

Figure 3:
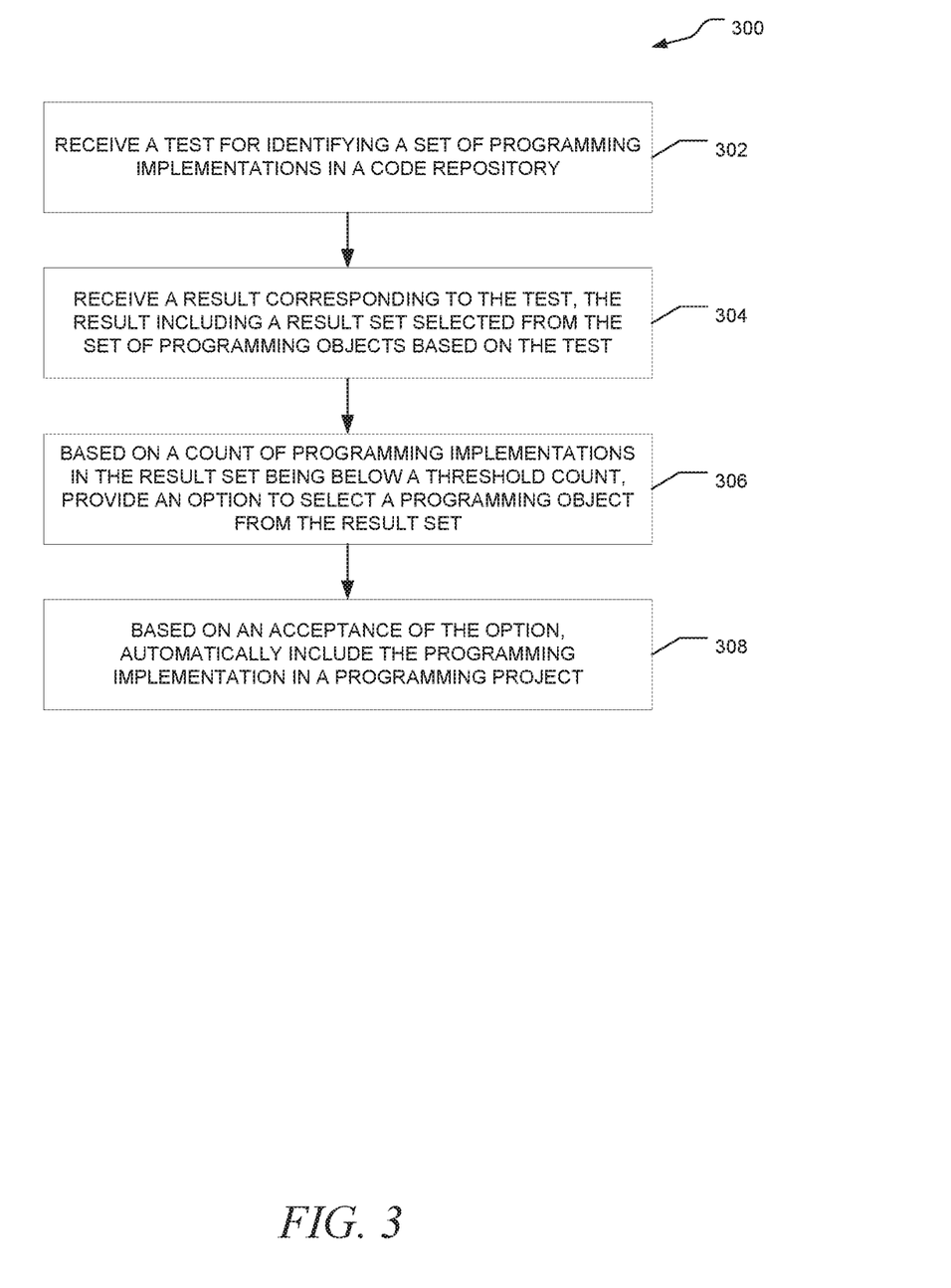
FIG. 3 is a flow chart of a method, in accordance with an example embodiment, of automatically identifying programming implementations in a code repository as candidates for inclusion in a programming project.

FIG. 3 is a flow chart of an example method 300 of automatically identifying programming implementations in a code repository as candidates for inclusion in a programming project. In example embodiments, this method may be implemented by the code reuse facilitation module 114 in conjunction with the reusable code repository manager application 124.

At operation 302, a test is received for identifying a set of programming implementations in a code repository. For example, a submission of a test is received via a user interface. In example embodiments, the test may specify one or more inputs and one or more outputs expected from the one or more inputs. For example, the test may specify that a programming implementation returns a value of 42 when it receives a value of 0 as an input value. In various embodiments, the test may specify any number of input parameters or any number of output parameters. In various embodiments, the test may specify no input parameters or no output parameters.

In example embodiments, the test is communicated from the code reuse facilitation module 114 to the reusable code repository manager application 124 for processing. The reusable code repository manager application 124 may then execute a routine for identifying programming implementations in the code repository that satisfy the test.

For example, in a Java environment, the reusable code repository manager application 124 may use reflection (e.g., the java.lang.reflect.Method API) to test whether a method "m" in the code repository satisfies the test:

Assert.assertEquals(m.invoke(null,0),42);

In example embodiments, the method "m" is a static method of a class "c". In example embodiments, a function "f" may be tested as an alternative or in addition to the method "m". While the searching is not limited to static methods, searching for suitable instance methods may add a significant level of complexity (e.g., an instance method can only be tested in the context of a suitable instance). Thus, in example embodiments, static methods may be given priority over instance methods. In example embodiments, all of the methods and functions in the code repository are searched in an asynchronous fashion (e.g., partial results may be returned to the code reuse facilitation module 114 while the complete search of the code repository is underway). Submissions of additional tests or notifications of deletions of previously submitted tests may be received during the searching. In such cases, the searching may be restarted or updated based on the changes to the set of tests that are to be applied. In example embodiments, a set of programming implementations satisfying certain requirements (e.g., having certain values for signatures or other metadata items) may allow a search set of programming implementations to be selected from the complete set of programming implementations in the code repository. In other words, a set of tests may be applied to a search set instead of all of the programming implementations in the code repository.

At operation 304, at least a partial result of an application of a set of tests against a search set of programming implementations in the code repository is received (e.g., they are communicated from the reusable code repository manager application 124 to the code reuse facilitation module 114). In example embodiments, the result includes a set of programming implementations from the search set that satisfy the set of tests.

At operation 306, an option may be provided to select a programming implementation from the result set. For example, a user interface may be generated and presented to a user that includes the identified programming implementations. In example embodiments, the providing of the option may include presenting values of metadata items corresponding to the identified programming implementations in the result set. In example embodiments, the option may not be provided unless or until the result set is small enough (e.g., has a number of items below a threshold value) or enough of the search has been completed (e.g., a certain percentage of the programming implementations in the code repository have been tested).

At operation 308, based on an acceptance of the option to select a programming implementation, the programming implementation is automatically included in a programming project. In example embodiments, a notification is then communicated to terminate further searching related to the identification of the programming implementation.

Figure 4:
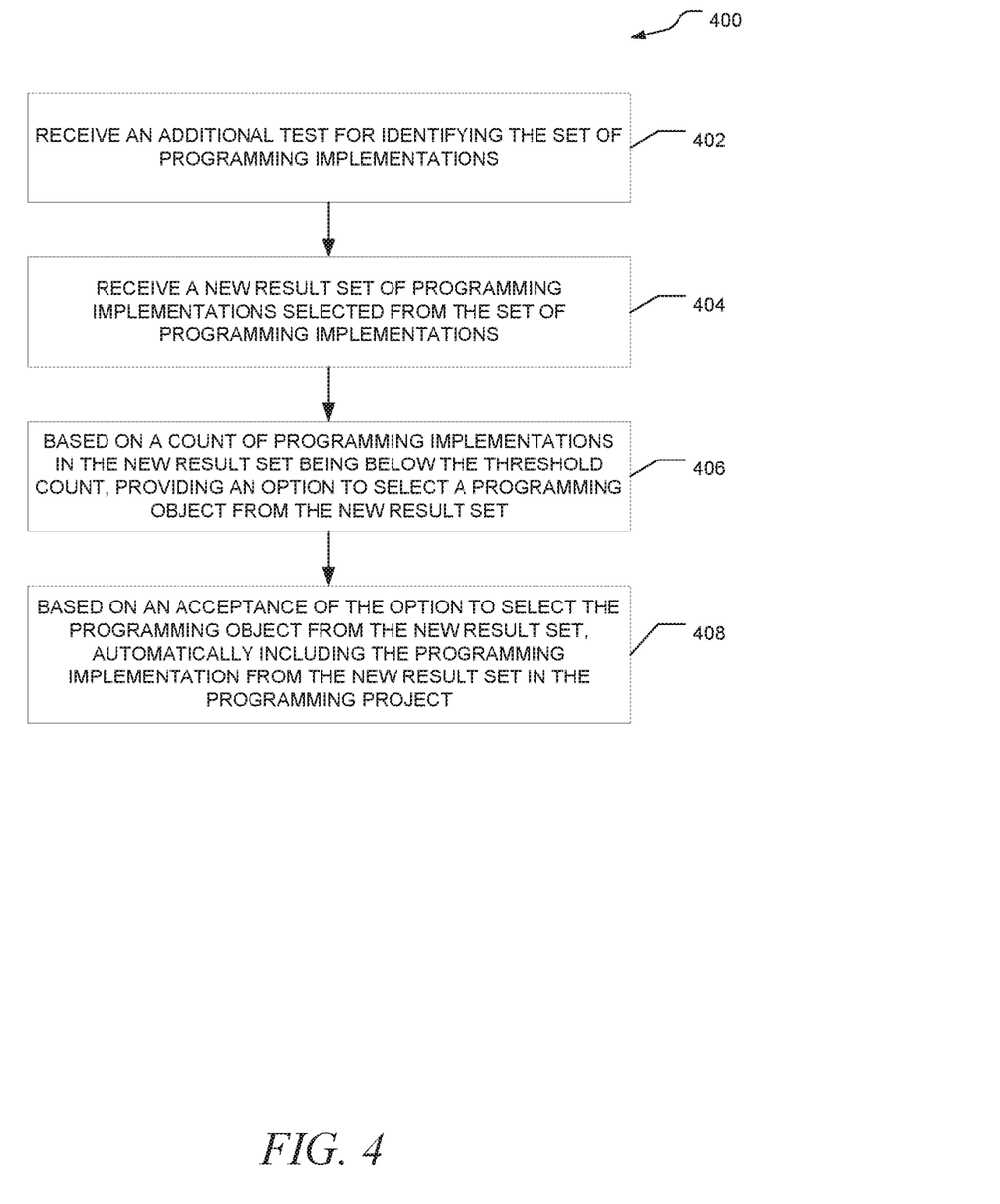
FIG. 4 is a flow chart of a method, in accordance with an example embodiment, of updating a result set based on a change to a set of test cases being made during the generation of the result set.

FIG. 4 is a flow chart of an example method 400 of updating a result set based on a change to a set of test cases being made during the generation of the result set. In example embodiments, this method may be implemented by the code reuse facilitation module 114 in conjunction with the reusable code repository manager application 124.

At operation 402, an additional test for identifying a set of programming implementations is received. Or, in example embodiments, a set of tests corresponding to a search of the code repository is otherwise modified (e.g., a test is removed or a value of a parameter is changed).

The modification to the search set is communicated from the code reuse facilitation module 114 to the reusable code repository manager application 124. The search set is modified based on the modification to the search set. For example, if a test is added, it may be determined that programming implementations that were previously tested and excluded may remain excluded. In this case, the previously tested programming implementations may be tested against the new test only. Additionally, it may be determined that a priority of the search should change (e.g., programming implementations that satisfied the previous search set should be made the highest priority for retesting) based on the modified search set. On the other hand, if a test is removed or a value of a parameter is changed, it may be determined that previously excluded programming implementations should be retested.

At operation 404, at least a partial additional test result is received (e.g., communicated from the reusable code repository manager application 124 to the code reuse facilitation module 114). The additional test result may include information pertaining to updates to the previous test result, such as an identification of previously identified programming implementations that no longer satisfy the set of tests based on the modification.

At operation 406, an option is provided to select a programming implementation from the additional result set. In example embodiments, the option may not be provided unless the additional result set is small enough (e.g., has a number of items below a threshold value) or enough of the search has been completed (e.g., a certain percentage of the programming implementations in the code repository have been tested).

In example embodiments, the additional result set is used to modify a previous result set. In example embodiments, as discussed above, metadata items corresponding to the additional result set are also received and presented in a user interface to assist in a determination of whether to accept the option. In example embodiments, the metadata items may not be submitted in test cases, but they may be used to filter results.

At operation 408, based on an acceptance of the option to select a programming implementation, the programming implementation is automatically included in a programming project. In example embodiments, a notification is then communicated to terminate further searching related to the identification of the programming implementation.

Figure 5:
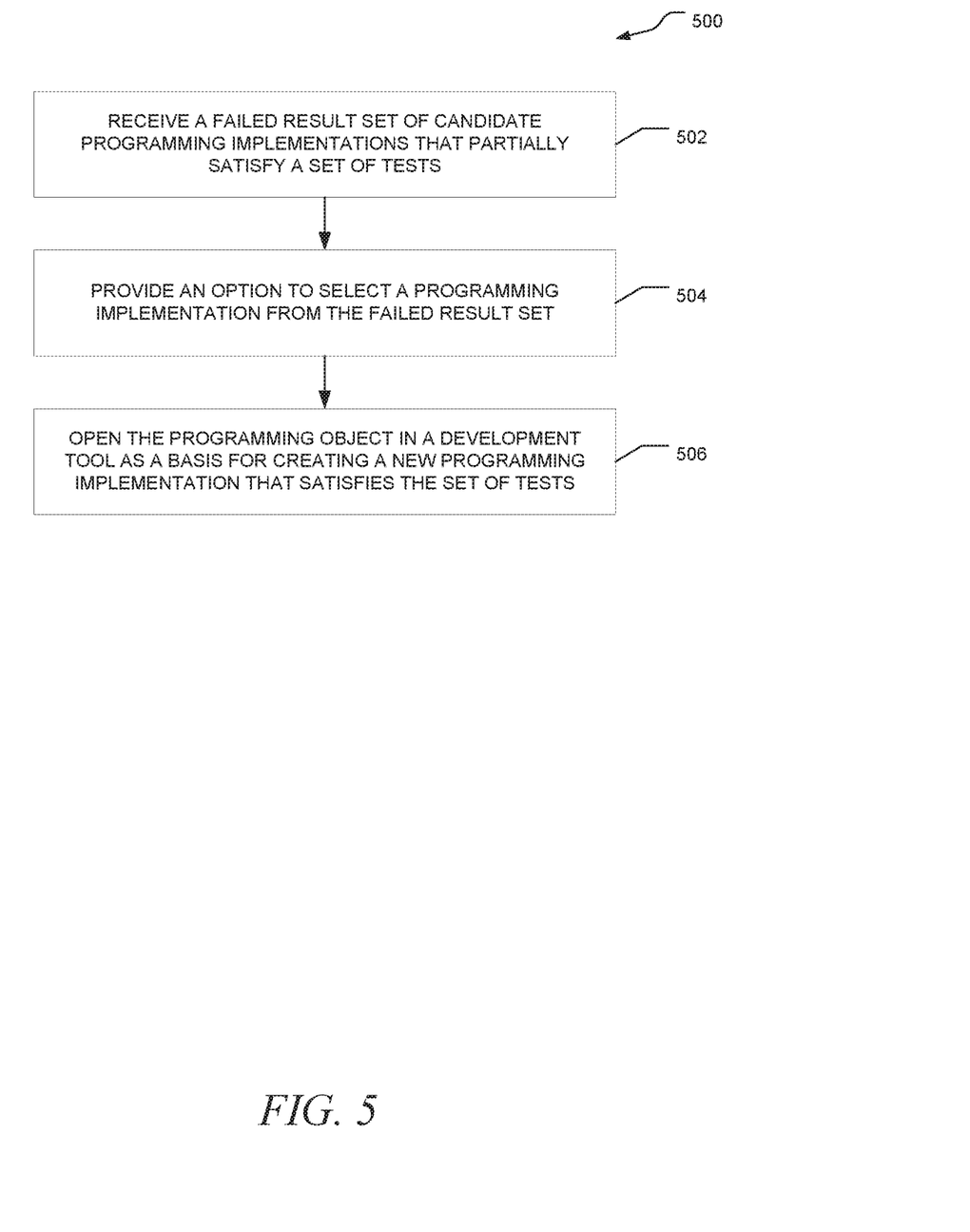
FIG. 5 is a flow chart of a method, in accordance with an example embodiment, of identifying candidate programming implementations in a code repository that partially satisfy a set of tests.

FIG. 5 is a flow chart of an example method 500 of identifying candidate programming implementations in a code repository that partially satisfy a set of tests. In example embodiments, this method may be implemented by the code reuse facilitation module 114 in conjunction with the reusable code repository manager application 124.

At operation 502, a failed result set of programming implementations is received (e.g., communicated from the reusable code repository manager application 124 to the code reuse facilitation module 114). The failed result set includes a set of candidate programming implementations that only partially satisfy a set of tests that were previously submitted.

At operation 504, an option is provided to select one of the programming implementations to use as a starting point for creating a new programming implementation that satisfies the set of tests. In example embodiments, the candidates may be sorted based on various factors, such as how many of the tests they satisfy, how closely their output values match expected or desired output values, or how closely their corresponding metadata items match specified metadata requirements. In other words, a piece of code in the repository may fail all tests, yet still be a prime candidate for manual adaptation. For example, if a code in the repository computes a numerical value that is always one more than the value prescribed by the tests, it may be a good candidate for adaptation.

At operation 506, the selected programming implementation is opened in a development tool for editing. In example embodiments, the programming implementation serves as a basis for developing a new programming implementation that satisfies all of the tests. In example embodiments, recommendations of changes are proposed based on the test results. For example, a parameter may be proposed for addition, modification, or deletion. Or a particular section of the implementation may be highlighted for editing. Upon completion of any additional development work, the modified programming implementation may be tested against the test cases. Based on the new implementation satisfying the tests, it may be automatically included in the programming project. Additionally, an option may be provided for submitting the new programming implementation for inclusion in the code repository.

These methods and the example embodiments disclosed herein may be implemented by a specially-configured computer system. The computer system may be specially configured by one or more modules (e.g., hardware modules or software modules) and implemented by one or more computer processors of the computer system. These methods and the example embodiments disclosed herein may be embodied as instructions stored on a machine-readable medium that, when executed by one or more processors of a computer system, cause the computer system to perform one or more of the operations described herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 6:
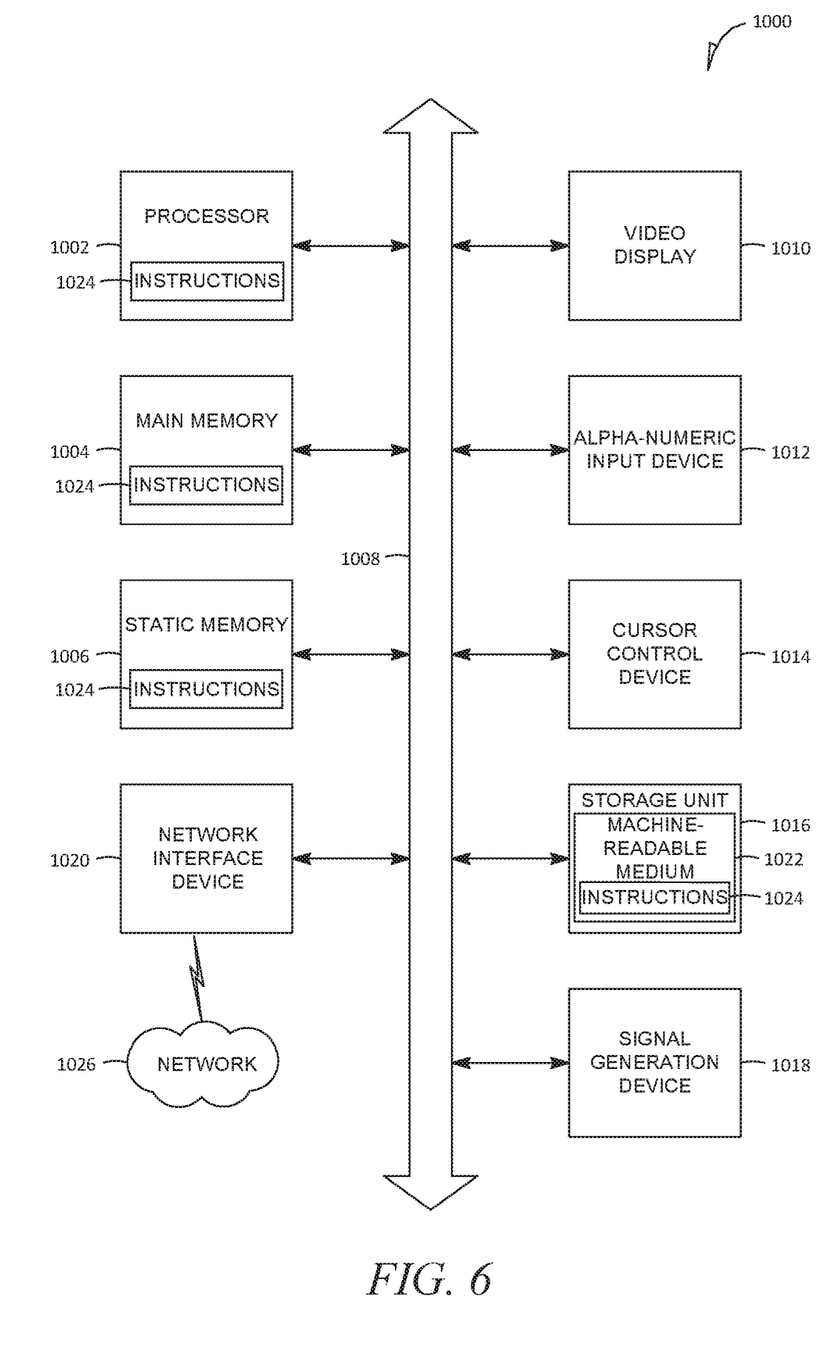
FIG. 6 is a block diagram of a machine in the example form of a computer system within which instructions for causing the machine to perform any one or more of the operations or methodologies discussed herein may be executed.

FIG. 6 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain olde telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more processors; and
   a module for a software development tool installed on the system, the module implemented by the one or more processors of the system, the module configured to communicate with an application executing on an additional system, the application configured to access a code repository stored on the additional system, the code repository including a plurality of programming implementations, the module further configured to, at least:
   receive a test, the test specifying a set of search parameters;
   receive a result, the result representing an application of the test by the application to each programming implementation of a first search set of programming implementations of the plurality of programming implementations, the result including a first result set of programming implementations selected from the plurality of programming implementations based on each programming implementation of the first result set satisfying the test;
   providing an option to select a programming implementation from the first result set, the providing of the option including communicating a correspondence of a first set of metadata items to the first result set, the metadata items being useful to assist with a determination pertaining to an acceptance of the option;
   based on the acceptance of the option to select the programming implementation from the first result set, automatically include the programming implementation in a programming project implemented using the software development tool;
   receive an additional test, the additional test specifying an additional set of search parameters;
   receive an additional result, the additional result representing an application of the additional test to each programming implementation of a second search set of programming implementations, the result including a second result set of programming implementations selected from the plurality of programming implementations based on each programming implementation of the second result set satisfying the additional test, the second search set including the first result set, the second search set not including programming implementations of the first search set that were not included in the first result set;
   provide an option to select a programming implementation from the second result set; and
   based on an acceptance of the option to select the programming implementation from the second result set, automatically include the programming implementation in a programming project, wherein the receiving of the additional test and the receiving of the additional result occurs before the acceptance of the option to select the programming implementation from the first result set and wherein the providing of the option to select the programming implementation from the first result set is replaced with the providing of the option to select the programming implementation from the second result set.

2. The system of claim 1, wherein the code repository includes a plurality of metadata items and the first set of metadata items is selected from the plurality of metadata items based on the correspondence.

3. The system of claim 1, wherein the first set of metadata items includes at least one of developer comments and a level of maturity of at least one of the programming implementations of the first result set.

4. The system of claim 1, wherein the first search set is selected based on a signature of the test.

5. A method comprising:
   receiving a test at a software development tool installed on a system, the test specifying a set of search parameters;
   communicating the test to an application executing on an additional system for processing, the processing including determining a result, the result representing an application of the test by the application to each programming implementation of a first search set of programming implementations of the plurality of programming implementations, the result including a first result set of programming implementations selected from the plurality of programming implementations based on each programming implementation of the first result set satisfying the test;
   receiving the result from the additional system;
   providing an option to select a programming implementation from the first result set, the providing of the option including communicating a correspondence of a first set of metadata items to the first result set, the metadata items being useful to assist with a determination pertaining to an acceptance of the option;
   based on an acceptance of the option to select the programming implementation from the first result set, automatically including the programming implementation in a programming project implemented using the software development tool;
   receiving an additional test, the additional test specifying an additional set of search parameters;
   receiving an additional result, the additional result representing an application of the additional test to each programming implementation of a second search set of programming implementations, the result including a second result set of programming implementations selected from the plurality of programming implementations based on each programming implementation of the second result set satisfying the additional test, the second search set including the first result set, the second search set not including programming implementations of the first search set that were not included in the first result set;

providing an option to select a programming implementation from the second result set; and based on an acceptance of the option to selecting the programming implementation from the second result set, automatically include the programming implementation in a programming project, wherein the receiving of the additional test and the receiving of the additional result occurs before the acceptance of the option to select the programming implementation from the first result set and wherein the providing of the option to select the programming implementation from the first result set is replaced with the providing of the option to select the programming implementation from the second result set.

6. The method of claim 5, wherein a code repository includes a plurality of metadata items and the first set of metadata items is selected from the plurality of metadata items based on the correspondence.

7. The method of claim 5, wherein the first set of metadata items includes at least one of developer comments and a level of maturity of at least one of the programming implementations of the first result set.

8. The method of claim 5, wherein the first search set is selected based on a signature of the test.

9. A non-transitory machine readable storage medium storing a set of instructions that, when executed by at least one processor of a machine, cause the machine to perform operations comprising:

receiving a test at a software development tool installed on a system, the test specifying a set of search parameters;

communicating the test to an application executing on an additional system for processing, the processing including determining a result, the result representing an application of the test by the application to each programming implementation of a first search set of programming implementations of the plurality of programming implementations, the result including a first result set of programming implementations selected from the plurality of programming implementations based on each programming implementation of the first result set satisfying the test;

receiving the result from the additional system;

providing an option to select a programming implementation from the first result set, the providing of the option including communicating a correspondence of a first set of metadata items to the first result set, the metadata items being useful to assist with a determination pertaining to an acceptance of the option;

based on an acceptance of the option to select the programming implementation from the first result set, automatically including the programming implementation in a programming project implemented using the software development tool;

receiving an additional test, the additional test specifying an additional set of search parameters;

receiving an additional result, the additional result representing an application of the additional test to each programming implementation of a second search set of programming implementations, the result including a second result set of programming implementations selected from the plurality of programming implementations based on each programming implementation of the second result set satisfying the additional test, the second search set including the first result set, the second search set not including programming implementations of the first search set that were not included in the first result set;

providing an option to select a programming implementation from the second result set; and based on an acceptance of the option to selecting the programming implementation from the second result set, automatically include the programming implementation in a programming project, wherein the receiving of the additional test and the receiving of the additional result occurs before the acceptance of the option to select the programming implementation from the first result set and wherein the providing of the option to select the programming implementation from the first result set is replaced with the providing of the option to select the programming implementation from the second result set.

10. The non-transitory machine readable storage medium of claim 9, wherein a code repository includes a plurality of metadata items and the first set of metadata items is selected from the plurality of metadata items based on the correspondence.

11. The non-transitory machine readable storage medium of claim 9, wherein the first set of metadata items includes at least one of developer comments and a level of maturity of at least one of the programming implementations of the first result set.

12. The non-transitory machine readable storage medium of claim 9, wherein the first search set is selected based on a signature of the test.

13. A system comprising:

one or more processors; and a module for a software development tool installed on the system, the module implemented by the one or more processors of the system, the module configured to communicate with an application executing on an additional system, the application configured to access a code repository stored on the additional system, the code repository including a plurality of programming implementations, the module further configured to, at least:

receive a test, the test specifying a set of search parameters;

receive a result, the result representing an application of the test by the application to each programming implementation of a first search set of programming implementations of the plurality of programming implementations, the result including a first result set of programming implementations selected from the plurality of programming implementations based on each programming implementation of the first result set satisfying the test;

providing an option to select a programming implementation from the first result set, the providing of the option including communicating a correspondence of a first set of metadata items to the first result set, the metadata items being useful to assist with a determination pertaining to an acceptance of the option;

based on the acceptance of the option to select the programming implementation from the first result set, automatically include the programming implementation in a programming project implemented using the software development tool receive an additional test, the additional test specifying an additional set of search parameters;

receive an additional result, the additional result representing an application of the additional test to each programming implementation of a second search set of programming implementations, the result including a second result set of programming implementations selected from the plurality of programming implementations based on each programming implementation of the second result set satisfying the additional test, the second search set including the first result set, the second search set not including programming implementations of the first search set that were not included in the first result set;

provide an option to select a programming implementation from the second result set; and based on an acceptance of the option to select the programming implementation from the second result set, automatically include the programming implementation in a programming project, wherein the first result set is a subset of a complete result set that is being determined asynchronously with respect to the receiving of the additional test and the providing of the option to select the programming implementation from the first result set.

14. The system of claim 13, wherein the code repository includes a plurality of metadata items and the first set of metadata items is selected from the plurality of metadata items based on the correspondence.

15. The system of claim 13, wherein the first set of metadata items includes at least one of developer comments and a level of maturity of at least one of the programming implementations of the first result set.

16. The system of claim 13, wherein the first search set is selected based on a signature of the test.

17. A method comprising:

receiving a test at a software development tool installed on a system, the test specifying a set of search parameters;

communicating the test to an application executing on an additional system for processing, the processing including determining a result, the result representing an application of the test by the application to each programming implementation of a first search set of programming implementations of the plurality of programming implementations, the result including a first result set of programming implementations selected from the plurality of programming implementations based on each programming implementation of the first result set satisfying the test;

receiving the result from the additional system;

providing an option to select a programming implementation from the first result set, the providing of the option including communicating a correspondence of a first set of metadata items to the first result set, the metadata items being useful to assist with a determination pertaining to an acceptance of the option;

based on an acceptance of the option to select the programming implementation from the first result set, automatically including the programming implementation in a programming project implemented using the software development tool;

receiving an additional test, the additional test specifying an additional set of search parameters;

receiving an additional result, the additional result representing an application of the additional test to each programming implementation of a second search set of programming implementations, the result including a second result set of programming implementations selected from the plurality of programming implementations based on each programming implementation of the second result set satisfying the additional test, the second search set including the first result set, the second search set not including programming implementations of the first search set that were not included in the first result set;

providing an option to select a programming implementation from the second result set; and based on an acceptance of the option to select the programming implementation from the second result set, automatically include the programming implementation in a programming project, wherein the first result set is a subset of a complete result set that is being determined asynchronously with respect to the receiving of the additional test and the providing of the option to select the programming implementation from the first result set.

18. The method of claim 17, wherein a code repository includes a plurality of metadata items and the first set of metadata items is selected from the plurality of metadata items based on the correspondence.

19. The method of claim 17, wherein the first set of metadata items includes at least one of developer comments and a level of maturity of at least one of the programming implementations of the first result set.

20. The method of claim 17, wherein the first search set is selected based on a signature of the test.

* * * * *